Patented Oct. 3, 1950

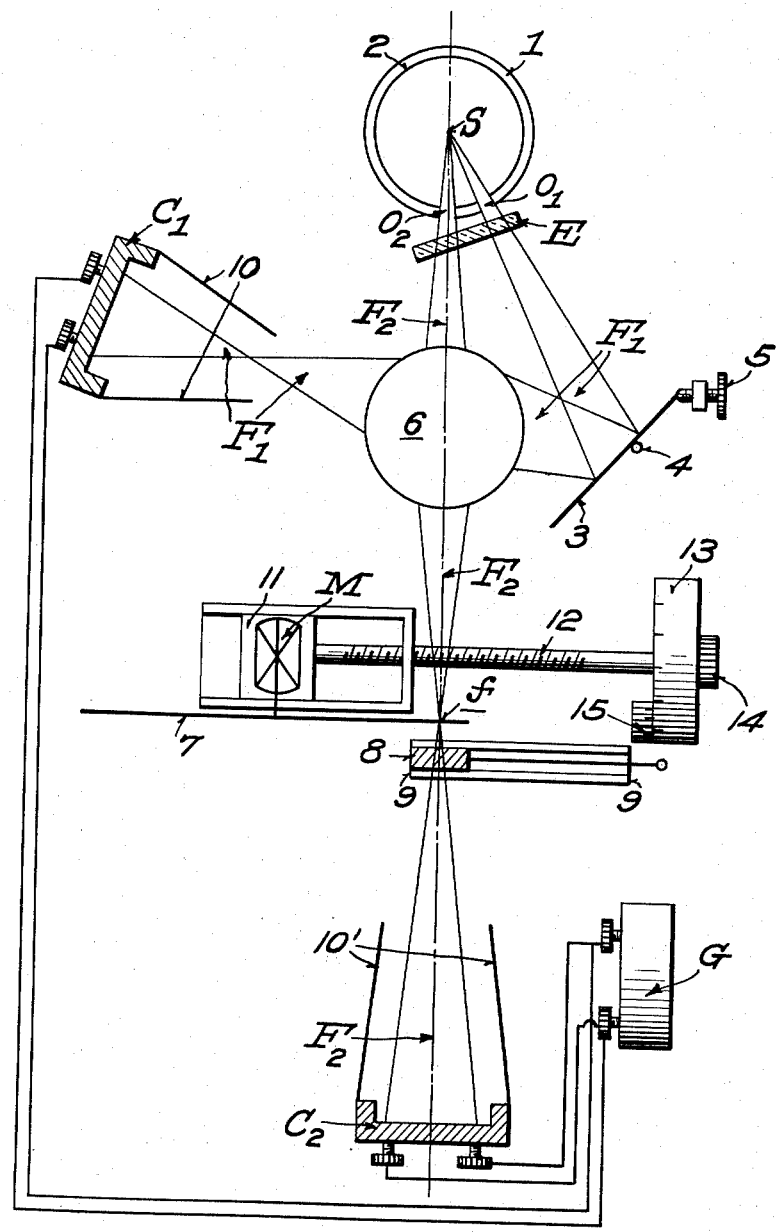

2,524,303

UNITED STATES PATENT OFFICE 2,524,303

PHOTOMETER

Paul Bonèt-Maury, Paris, France

Application June 20, 1947, Serial No. 755,907
In France March 7, 1940

Section 1, Public Law 690, August 8, 1946
Patent expires March 7, 1960

2 Claims. (Cl. 88—23)

The object of the present invention is a photometer apparatus of the general type in which the intensity of a beam of light rays is made to vary and is then compared photo-electrically with a datum beam, the comparison enabling an easy reading to be obtained of the value of the absorption of the measuring beam by the body of which it is desired to measure the said absorption. In principle (reference Kanner, French Patent No. 793,947 of November 12, 1934) the photometer according to the invention comprises a point-like source of light divided into two beams, each directed onto a photo-electric cell provided with a stop layer. These two photoelectric cells are balanced across the terminals of a microammeter or of a galvanometer used as a zero indicator. One of the beams is used as a datum and the other, the measuring beam, successively passes through the zone controlled by a Sector wheel with two symmetrical blades, the plane of which is at right angles to the axis of the beam, and then the medium of which it is required to measure the absorption (solid, liquid or gaseous medium).

The cross-sectional shape of the blades of the wheel is so calculated that, by giving to said wheel a linear movement in its plane, an exponential variation is produced of the intensity of the beam transmitted, whatever be the initial position of said wheel.

The micro-ammeter being at zero, the introduction of the absorbing body into the measuring beam necessitates a certain movement of the wheel in order to bring back the intensity of the beam transmitted to its initial value. The measurement of this movement is proportional to the optical density of the substance examined.

The device described in no case necessitates having recourse to a standard absorbing substance and directly gives the absolute value of the absorption, i. e. the optical density.

The accompanying drawing shows diagrammatically the apparatus according to the invention, the embodiments of which may vary in detail according to the technical requirements of construction. The source of light S comprises an incandescent lamp S with a point-like filament. Said lamp is supplied through a transformer (not shown) and is placed in a cylindrical tube 1 provided with openings $O_1$ and $O_2$, the distance between which can be adjusted by means of a ring 2. The lamp is mounted on a support (not shown) which enables the filament to be suitably directed relatively to the openings $O_1$ and $O_2$. A screen E of coloured glass, adapted to be fixed to the tube 1, enables the spectral composition of the light used to be altered.

The standard beam $F_1$ issuing from $O_1$ is reflected by the mirror 3, which is movable about a vertical axis 4, and passes through the spherical diopter 6 (spherical flask with the bottom filled with water) and falls on the photo-electric cell $O_1$.

The rotation of the mirror 3 about its axis 4 is controlled by the screw 5. Furthermore, the mirror can be partly hidden by operating a movable shutter not shown. It is also possible to direct onto the cell C all or a variable fraction of the beam F condensed by the sphere 6.

The measuring beam $F_2$ issuing from $O_2$ passes through the same diopter 6 and converges at $f$ onto the Sector wheel 7. It then falls on the tank 8 containing the substance of which it is required to measure the absorption; said tank is mounted on a support sliding in a guideway 9—9, which enables the substance to be measured to be moved into or out of the path of the beam $F_2$. The shape and the dimensions of the tank may vary according to the nature of the solid, liquid or gaseous substance.

For the particular case of bacteriology (cloudiness of microbial emulsions) use is made of a small cylindrical tank filled with water, electrically maintained at 37° C. and provided, for the inlet and the outlet of the measuring beam, with two openings with parallel faces. This device (not shown in the figure) enables in particular the opacity to be measured of microbial culture contained in a sealed cylindrical tube, its variations of opacity in time to be followed and even to be recorded readily. The narrowness of the beam F makes it possible to use tanks of very small dimensions when this is necessary and the measurement of the absorption of liquids can be effected with samples of 1 cc. or less.

The cells $C_1$ and $C_2$, which may be selenium photo-electric cells, are balanced across the terminals of the galvanometer G. In the example chosen, they are protected from unwanted lighting by two cones of blackened sheet metal 10 and 10' which are mounted on adjustable supports (not shown).

The Sector wheel 7 comprises two blades of logarithmic cross-sectional shape mounted on the shaft of a motor M fixed to the carriage 11, the movements of which are controlled by a screw 12 and are respectively measured, for the millimetres by means of a ruler (not shown) and for the fractions of a millimetre by the rotation of a drum 13 which is operated by means of a knob 14 and is provided with a vernier 15. The plane of the wheel is at right angles to the axis of $F_2$.

The lamp being lighted, without inserting the substance to be measured, the galvanometer G is adjusted to zero by acting first on the mirror 3 by means of the screw 5 (rough adjustment) then on the carriage 11 (fine adjustment) and the position of the carriage is noted from the reading on the drum and the ruler. The body to be measured is then introduced into the beam $F_2$ by means of the guideway 99 and the galvanometer is reset to zero by moving the carriage. The new position of said carriage gives the movement effected, i. e. the absorption by the Sector wheel equivalent to that of the substance to be measured. The cross-sectional shape of the blades of the wheel has been so arranged that a movement of 1 millimetre corresponds to an optical density of 0.01. The vernier 15 enables a movement of one hundredth of a millimetre to be read; that is to say that the theoretical sensitivity of the photometer enables an optical density of 0.0001 or $10^{-4}$ to be appreciated. This sensitivity is limited in practice by the play of the mechanical parts of the carriage and of the motor. It also depends on the flux received by the cell, i. e. on the power dissipated by the source S which is adjustable by means of a rheostat. This adjustment, which enables the luminous flux to be reduced, makes it unnecessary to shunt the galvanometer and makes it possible to vary at will the sensitivity of the apparatus within wide limits.

By using two tanks (4 cm. and 2 mm. thick), it is possible to measure, for liquids for example, opacities between 2.5 and 0.0001 with an absolute error which is substantially constant of about 0.0001 and a relative error of 0.0002 in the first case and of 10% in the second.

The device described enables the measurement of the absorptions in absolute value to be effected on samples of small size. Its construction is inexpensive, the optical system being reduced to a glass ball filled with water. The balanced circuit used makes the measurement independent of the variations of the source. The reduction of the intensity of the beam by the Sector wheel can be measured with great accuracy and is independent of the state of polarisation and also of the spectral composition of the light used.

Since this device does not require beams providing uniform illumination, it enables large openings to be used and provides an excellent luminosity with low power sources.

What I claim is:

1. A photometer comprising a source of light, a pair of photoelectric cells connected in a balanced circuit, a galvanometer connected in parallel to the cells, means each directing a beam of light rays to one of the cells, a light absorbing symmetrical blade wheel rotatable in a plane at right angles to one of the beams and movable in said plane along a straight line, each blade having a predetermined logarithmic cross section, and means operable to displace the wheel in said plane along the straight line.

2. The photometer according to claim 1, and also comprising operable means indicating the opacity to be measured as a linear function of the displacement of the blade wheel.

PAUL BONÈT-MAURY.

REFERENCES CITED

The following references are of record in the file of this patent:

UNITED STATES PATENTS

| Number | Name | Date |
|---|---|---|
| 1,919,182 | Fitzgerald | July 18, 1933 |
| 1,998,461 | Kucher | Apr. 23, 1935 |
| 2,080,613 | Lange | May 18, 1937 |
| 2,420,013 | Rajchman | May 6, 1947 |

FOREIGN PATENTS

| Number | Country | Date |
|---|---|---|
| 793,947 | France | Nov. 12, 1934 |
| 645,203 | Germany | May 24, 1937 |
| 875,777 | France | Oct. 2, 1942 |